US006722291B2

United States Patent
Adams et al.

(10) Patent No.: US 6,722,291 B2
(45) Date of Patent: Apr. 20, 2004

(54) SEPARATION MEMBERS FOR SELECTIVE PLACEMENT BETWEEN SHEET MEMBERS ORIENTED HORIZONTALLY AND STACKED VERTICALLY AND METHOD OF USAGE THEREOF

(75) Inventors: Fred L. Adams, Wilmington, NC (US); Robert I. Handler, Wilmington, NC (US); Robert R. Schlegel, Monroe Township, NJ (US)

(73) Assignee: Slooters, Inc., Burgaw, NC (US)

( * ) Notice: Subject to any disclaimer, the term of this patent is extended or adjusted under 35 U.S.C. 154(b) by 112 days.

(21) Appl. No.: 10/100,842

(22) Filed: Mar. 19, 2002

(65) Prior Publication Data
US 2003/0177958 A1 Sep. 25, 2003

(51) Int. Cl.⁷ .............................................. B65D 19/38
(52) U.S. Cl. ..................................... 108/53.1; 108/51.3
(58) Field of Search .......................... 108/56.11, 53.1, 108/51.3, 91, 56.3, 57.1; 206/386, 598, 599, 600

(56) References Cited

U.S. PATENT DOCUMENTS

| | | | |
|---|---|---|---|
| 2,150,960 A | | 3/1939 | Bertel |
| 2,779,487 A | | 1/1957 | Harris |
| 2,798,600 A | * | 7/1957 | O'Konski ................. 206/597 |
| 2,895,608 A | * | 7/1959 | Wilson ...................... 206/597 |
| 3,097,741 A | * | 7/1963 | Schwartz .................. 206/597 |
| 3,814,489 A | * | 6/1974 | Clark et al. ............... 108/53.1 |
| 3,942,654 A | * | 3/1976 | Warrick .................... 108/56.3 |
| 4,042,127 A | | 8/1977 | Brossia |
| 4,065,014 A | | 12/1977 | Sagmiller |
| 4,116,344 A | | 9/1978 | Ziemba |
| 4,148,394 A | * | 4/1979 | Bederman ................. 108/56.3 |
| 4,317,517 A | * | 3/1982 | Tisdale ..................... 206/597 |
| 4,509,433 A | * | 4/1985 | Farr .......................... 108/52.1 |
| 4,518,151 A | | 5/1985 | Dill, Jr. |
| 4,579,320 A | * | 4/1986 | Gladish .................... 108/51.11 |
| 4,708,252 A | | 11/1987 | Azzi |
| 5,141,109 A | * | 8/1992 | Bergeron, Sr. ............ 206/599 |
| 5,174,448 A | | 12/1992 | Flaig |
| 5,427,019 A | | 6/1995 | Moorman |
| 5,472,540 A | | 12/1995 | Marschke et al. |
| 5,909,808 A | | 6/1999 | Bartholomew |
| 6,018,858 A | | 2/2000 | Taylor |
| RE36,687 E | | 5/2000 | Marschke et al. |
| 6,092,350 A | | 7/2000 | Dumlao et al. |
| 6,286,693 B1 | | 9/2001 | Brown |
| 6,290,082 B1 | | 9/2001 | Van Giezen et al. |

FOREIGN PATENT DOCUMENTS

| JP | 62-157893 | * | 7/1987 |
|---|---|---|---|
| JP | 2-258554 | * | 10/1990 |

* cited by examiner

Primary Examiner—Jose V. Chen
(74) Attorney, Agent, or Firm—Sperry, Zoda & Kane

(57) ABSTRACT

A specially configured spacer comprising a separation member for use oriented in arrays between sections of horizontally oriented sheet material such as sheetrock to allow handling of the individual sections thereof separately from one another. The separation members are configured such as to facilitate re-use thereof including a slot defined in the interlocking cellular construction thereof adapted to receive banding for compactly securing together a plurality of such separation members to facilitate recycling usage thereof. The separation member includes two planar support members spaced apart by an interlocking cellular construction for defining therebetween recesses for receiving the arms of a forklift to facilitate handling of the sections individually while still allowing recycling of the separation members for re-use thereof.

14 Claims, 4 Drawing Sheets

SEPARATION MEMBERS FOR SELECTIVE PLACEMENT BETWEEN SHEET MEMBERS ORIENTED HORIZONTALLY AND STACKED VERTICALLY AND METHOD OF USAGE THEREOF

BACKGROUND OF THE INVENTION

1. Field of the Invention

The present invention deals generally with the field of pallet design. Conventional pallets are by convention usually square and provide a means for allowing a forklift to extend thereinto to facilitate lifting of materials stacked on the pallet.

The present invention applies to that specific subset of such pallet supports used for transporting of horizontally oriented sheet material stacked vertically. Such material could comprise sheetrock, wallboard or plywood or any material which is generally sold for use mostly for construction in sheets of, for example, two or four feet wide and anywhere between four and twenty feet in length. However, most usually the sheet material is four foot in width and between eight and twelve feet in length. When stacked horizontally these materials such as wallboard can be extremely heavy and the present invention provides a new and improved means for facilitating handling of these very heavy vertical stacks of horizontally oriented sheet material utilizing a reusable and recyclable separation member positionable in arrays between sections of the stack.

2. Description of the Prior Art

The primary prior art to the present invention is shown in FIG. 9 of the present application. The current state of the art separates sections of vertically stacked horizontally oriented sheet materials with items commonly referred to as slooters. This usage of slooters is most commonly with wall board or sheetrock. It is necessary to provide spaces in the vertically extending stack into which the arms of a forklift can extend to facilitate moving of portions of the stack by moving one or more individual sections at a time. FIG. 9 shows the current state of the art method for this purpose. The multiple horizontally oriented sheets of sheetrock are separated by narrow strips of sheetrock or wallboard normally cut at the location of manufacture of the sheetrock. These items are all commonly referred to as slooters and five or six such items are stacked vertically to define approximately two and a half to three inches between sections of a sheetrock stack to facilitate handling thereof by a forklift.

With ⅝th inch thick wallboard normally five slooters will be stacked upon one another and used as spacers thereby achieving a spacing of two and a half to three inches. On the other hand, with wallboard which is ½ inch in thickness, five or six strips approximately two to three inches wide will be utilized to provide this same desired spacing. These pieces will be stacked vertically and spaced apart from similar stacks of pieces as shown in FIG. 9. The present invention provides a reusable separation member which includes two planar support members for contacting the wallboard above and below the separation member as well as an interlocking cellular construction for maintaining these two planar support members separated from one another by approximately two and a half to three inches. In this manner the separation members of the present invention are effective in defining recesses for receiving the forks of lifting mechanisms which still being reusable.

Prior art configurations and constructions for use with vertical stacks of horizontally extending sheet members are commonly known as shown in U.S. Pat. No. 2,150,960 patented Mar. 21, 1939 to C. A. Bertel on an "Apparatus For Handling Bales And The Like"; and U.S. Pat. No. 2,779,487 patented Jan. 29, 1957 to F. D. Harris on a "Vehicle Mounted Handling Device For Pallet Stacks"; and U.S. Pat. No. 4,042,127 patented Aug. 16, 1977 to C. E. Brossia and assigned to Adolph Coors Company on a "Slip Pallet And Divider Sheet"; and U.S. Pat. No. 4,065,014 patented Dec. 27, 1977 to D. J. Sagmiller on a "Slipsheet Pallet Tool And Method"; and U.S. Pat. No. 4,116,344 patented Sep. 26, 1978 to T. J. Ziemba on a "Fluid Pallet And A Method Of Stacking And Storing Goods"; and U.S. Pat. No. 4,518,151 patented May 21, 1985 to M. R. Dill, Jr. on an "Article Separator For Materials Handling"; and U.S. Pat. No. 4,708,252 patented Nov. 24, 1987 to V. D. Azzi and assigned to The Kingston-Warren Corporation on a "Storage Rack System"; and U.S. Pat. No. 5,174,448 patented Dec. 29, 1992 to V. L. Flaig and assigned to Guardian Industries Corp. on a "Container For Shipping And Stacking Sheets Of Glass"; and U.S. Pat. No. 5,427,019 patented Jun. 27, 1995 to S. E. Moorman and assigned to Georgia-Pacific Corporation on "Sheet Material Pallet With Wrap Around Deck"; and U.S. Pat. No. 5,472,540 patented Dec. 5, 1995 to C. R. Marschke et al and assigned to Marquip, Inc. on a "Method And Apparatus For Making Pallet Supports And Pallets Incorporating Said Supports"; and U.S. Pat. No. 5,909,808 patented Jun. 8, 1999 to D. M. Bartholomew and assigned to Menasha Corporation on a "Container For Horizontally Stacked Sheets"; and U.S. Pat. No. 6,018,858 patented Feb. 1, 2000 to R. R. Taylor on a "Method And Apparatus For Separating Layered Material"; and U.S. Reissue Pat. No. Re. 36,687 patented May 9, 2000 to C. R. marschke et al and assigned to Marquip, Inc. on a "Method And Apparatus For Making Pallet Supports And Pallets Incorporating Said Supports"; and U.S. Pat. No. 6,092,350 patented Jul. 25, 2000 to C. Dumlao et al and assigned to Martin Marietta Materials, Inc. on a "Modular Polymer Matrix Composite Support Structure And Methods Of Constructing Same"; and U.S. Pat. No. 6,286,693 patented Sep. 11, 2001 to H. E. Brown and assigned to Alltrista Corporation on a "Rack Support System For Plastic Pallets"; and U.S. Pat. No. 6,290,082 patented Sep. 18, 2001 to M. Van Giezen et al and assigned to Royal Packaging Industry Leer N. V. on a "Pallet Container With Grid Support Structure".

SUMMARY OF THE INVENTION

The present invention provides a separation member which is usable for selective placement between sheet members which themselves are oriented horizontally and are stacked vertically. In this manner the separation member will define recesses between sections of the sheetrock which allows a forklift to extend between the sheet members and between the separation members to facilitate simultaneously handling of the sheet members located thereabove without causing movement of any of the separation members in the array at the same level as the forklifting arms.

Each of these separation members includes a first planar support member extending horizontally across and above the stacked sheet members and in abutment therewith. This first planar support member will have a length to width ratio of at least 10-1. This high ratio of length to width facilitates the defining of recesses between the separation members for receiving of the lifting arms of a forklift while at the same time allowing air flow therethrough for ventilation for drying of the sheet members to prevent unwanted accumulation of water therein which can have many destructive effects such as mildew and the like. Also the high length to width ratio of 10-1 or more facilitates recycling of the separation members by allowing them to be returned to the point of origin or manufacture of the sheet members for re-use thereof in a compact manner.

A second planar support member may also be positioned extending horizontally below the vertically adjacently positioned horizontally oriented sheet members thereabove and in abutment therewith for supporting of it in spaced relation above the adjacent sheet member thereunder. This second planar support member also preferably has a length to width ratio of at least 10-1 and is fixedly secured in spaced relation vertically above the first support member by a distance sufficient to allow forklift arms to extend thereadjacent between the sheet members vertically and between the separation members horizontally. In this manner lifting of any horizontally oriented sheet members of the stack and, in particular, one or more sections thereof will be facilitated when moved with a forklift. It is also important to note that when the individual sections are moved by placement of the forklift arms into recesses, the array of separator members thereadjacent which define the recesses receiving the forklift arms will not move with the stack. This greatly facilitates recycling and re-use of the separation members.

An interlocking cellular construction is also included in the present invention fixedly secured to the first planar support member and a second planar support member such that it extends therebetween for maintaining them in spaced relation to one another and for enhancing support provided by the second planar support member for the sheet members positioned above. The interlocking cellular construction includes a supporting extrusion preferably formed of a thermoplastic material such as polyethylene. It should be appreciated, however, that any thermoplastic material is usable as long as it is impervious to water absorption and can provide sufficient structural strength in the interlocking cellular construction.

The supporting extrusion is designed for reinforcing the spatially distant positioning of the first planar support member in relation to the second planar support member. Preferably the first planar support member and the second planar support member and the interlocking cellular construction are formed as a single integral member extruded from thermoplastic material for enhancing structural strength and facilitating recycling usage thereof.

The interlocking cellular construction and the supporting extrusion formed thereby preferably includes a vertical support means extending vertically between the first planar support member and the second planar support member and extending longitudinally therealong for facilitating strengthening thereof. This vertical support beam is preferably oriented perpendicularly with respect to the first planar support member and with respect to the second planar support member. In this manner the vertical support beam will extend upwardly from the first planar support member and downwardly from the second planar support member in such a manner as to define an I-beam support component which significantly enhances the structural strength of each of the separation members. The vertical support beam preferably defines a drainage hole positioned extending therethrough in order to facilitate fluid drainage therethrough as desired.

A plurality of cellular walls extend perpendicularly with respect to the first planar support member and the second planar support member and also extend perpendicularly in a horizontal orientation with respect to the vertical support beam in order to define an interlocking cellular construction therebetween which facilitates strengthening of each of the separation members. The cellular wall construction can also define a strapping notch therein which facilitates banding together of a plurality of the separation members to facilitate gathering thereof for re-use. Each of the strapping notches are preferably oriented extending perpendicularly with respect to the first planar support members and the second planar support member in such a manner as to facilitate temporary banding together laterally of a plurality of separation members for facilitating recycling. A banding means may be included which is adapted to be positionable extending into the strapping notch of at least one or more of the separation members in order to facilitate selective lateral securement of a plurality of separation members together to facilitate handling thereof during recycling.

One of the important characteristics of the present invention is to maintain firm and secure engagement between the first planar support member and the second planar support member and the sheet members in abutment therewith. For this reason the coefficient of friction of the first planar support member and the second planar support member surfaces which will abut the sheet members is an extremely important consideration. The present invention further contemplates the possibility of inclusion of a friction enhancing means located on the first planar support member and the second planar support member for increasing coefficient of friction thereof and facilitating abutting engagement with the horizontally extending sheet members thereadjacent. This friction enhancing means can comprise a variety of different means one of which could be a friction tape applied over the surfaces of the first planar support member and the second planar support member where they will abut the sheet members to enhance gripping of the abutment surfaces therebetween.

Each of the separation members of the present invention is preferably rectangular in cross section with a length to width ratio of at least 10-1. In this manner at least two of the separation members are positioned at each level between the sheet members in an array to define therebetween forklift receiving recesses. This array normally will include three or four or even more individual separation members at each location but a minimum of two is required within each array. These arrays separate sections of the vertically extending stack by defining the forklift receiving recesses thereadjacent. These recesses allow a forklift to extend thereinto to facilitate lifting of individual sections of the horizontally oriented sheet members thereabove without initiating any movement of the separation members at the level at which the forklift extends into the recesses. In a preferred configuration these separation members will be spaced apart from one another approximately 24 inches in order to define the forklift receiving recesses therebetween. This distance can vary between one and three feet but 24 or more inches has been determined to be the most advantageous spacing which provides support for sections of the sheet members thereabove while at the same time provides enough variation in spacing laterally such that the forklift can easily extend into the forklift receiving recesses as desired.

In use the present invention is designed for movement of a large stack of horizontally oriented sheet members from a first location to a second location and separated by arrays of separation members along with recycling of the separation members by returning thereof to the first location for re-use. The separation members are designed for selective placement between sheet members oriented horizontally and stacked vertically in order to allow a forklift to extend between the sheet members and between the separation members to facilitate simultaneous handling of multiple sheet members by causing movement of one or more sections thereof.

In use a vertically extending stack containing a plurality of horizontally oriented sheet members is formed at a first location. Such first location normally comprises a manufacturing location but it can comprise a storage location or warehouse for temporary housing of the sheet members prior to shipment thereof to a second location where they will be either used or sold.

A plurality of longitudinally extending separation members are then provided at the first location. The vertically extending stack is divided into a plurality of individual sections with an array of longitudinally extending separation members placed horizontally for separating each section from one another by a distance great enough to receive the forklift arms extending therebetween. Each section is a subset of the total stack of sheet members. The separation members within each array are spaced apart horizontally to a sufficient extent to define therebetween a plurality of forklift receiving recesses in order to allow the forklift to extend thereinto. This vertically extending stack of a plurality of sections of horizontally oriented sheet members can then be transported from the first location which is the point of manufacture or storage to a second location which is normally the point of use or sale for distribution thereof. This distribution can comprise sale at a retail home center or similar retail outlet or can comprise direct shipment to a construction site for providing the horizontally oriented sheet materials for immediate use in construction there.

At the second location the horizontally oriented sheet members such as wallboard or the like will be distributed by retail sale thereof or by use thereof at a construction site. As each section of horizontally oriented sheet members is completely utilized the separation members in the array of separation members which is then exposed are accumulated at a gathering location. Once a sufficient number of separation members are gathered from the arrays from one or more stacks of horizontally oriented sheet material they can be returned from the second location to the first location to facilitate re-use and recycling thereof.

Re-use or recycling is greatly enhanced by the specific configuration of the separation members of the present invention. They are rectangular in cross section and are at least ten times as long as they are wide. This narrow width configuration greatly facilitates the defining of the horizontally oriented recesses for receiving of the forklift materials and more significantly facilitates compact packing or stacking of the separation members for transportation thereof back to the first location where the sheet members are stored or manufactured to facilitate re-use thereof. It should be noted that the individual separation members can have horizontally extending drainage apertures defined therein which facilitates drying thereof and ventilation therethrough which is desirable to prevent any accumulation of moisture or other undesirable qualities of the vertically extending stack.

Recycling is also significantly enhanced by the defining of a notch in the cellular support construction of the separation members. Preferably this notch is oriented perpendicularly relative to the first and second planar support members in order to prevent the slot from contacting the sheet members during stacking. This slot is defined to receive a band which can extend therethrough and bind together a plurality of separation members into a compact stack with the banding means restrained in position by the notch defined in the separation members themselves.

One of the important constructions of the present invention is in the I-beam support structure defined by the vertical support beam in combination with the first and second planar support members. This I-beam component provides a significantly enhanced structural member oriented in the vertical direction which is required in order to maintain the integrity of a vertical stack of horizontally oriented sheet members which stack can be extremely heavy.

It is an object of the present invention to provide a separation member for selective placement between sheet members oriented horizontally and stacked vertically along with a method of use thereof wherein forklift receiving recesses are defined between separation members located in an array between sections of stacked sheet members.

It is an object of the present invention to provide a separation member for selective placement between sheet members oriented horizontally and stacked vertically along with a method of use thereof wherein sheet members stacked vertically are divided into sections to facilitate movement thereof.

It is an object of the present invention to provide a separation member for selective placement between sheet members oriented horizontally and stacked vertically along with a method of use thereof wherein movement of separate sections of horizontally oriented sheet members is possible without moving of the separation members stacked therewith to define sections thereof.

It is an object of the present invention to provide a separation member for selective placement between sheet members oriented horizontally and stacked vertically along with a method of use thereof wherein two planar support members are separated by an interlocking cellular construction having an I-beam construction for facilitating support thereof.

It is an object of the present invention to provide a separation member for selective placement between sheet members oriented horizontally and stacked vertically along with a method of use thereof wherein the first planar support, the second planar support member and the interlocking cellular construction of the present invention is formed as a single integral unit.

It is an object of the present invention to provide a separation member for selective placement between sheet members oriented horizontally and stacked vertically along with a method of use thereof wherein the first planar support member and the second planar support member and the interlocking cellular construction of the present invention is all formed as a single piece from a thermoplastic extrusion.

It is an object of the present invention to provide a separation member for selective placement between sheet members oriented horizontally and stacked vertically along with a method of use thereof wherein a vertical support beam is oriented perpendicular to the first and second planar support members to facilitate strengthening and support thereof.

It is an object of the present invention to provide a separation member for selective placement between sheet members oriented horizontally and stacked vertically along with a method of use thereof wherein forklift receiving recesses approximately two feet wide are defined between individual separation members within a given array thereof.

It is an object of the present invention to provide a separation member for selective placement between sheet members oriented horizontally and stacked vertically along with a method of use thereof wherein a strapping notch is defined in the interlocking cellular construction of each separation member adapted to receive a banding means therein for facilitating securement of a plurality of separation members together with respect to one another for aiding in recycling usage thereof.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

The present invention includes a plurality of separation members 10 which are designed to be positioned between horizontally oriented sheet members 12 placed in vertically extending stacks 14 thereof. The sheet members 12 normally can comprise plywood, wallboard (sheetrock), or particle board and can be extremely heavy. The present invention is particularly usable when the sheet members 12 are formed of sheetrock or wallboard.

Figure 7:
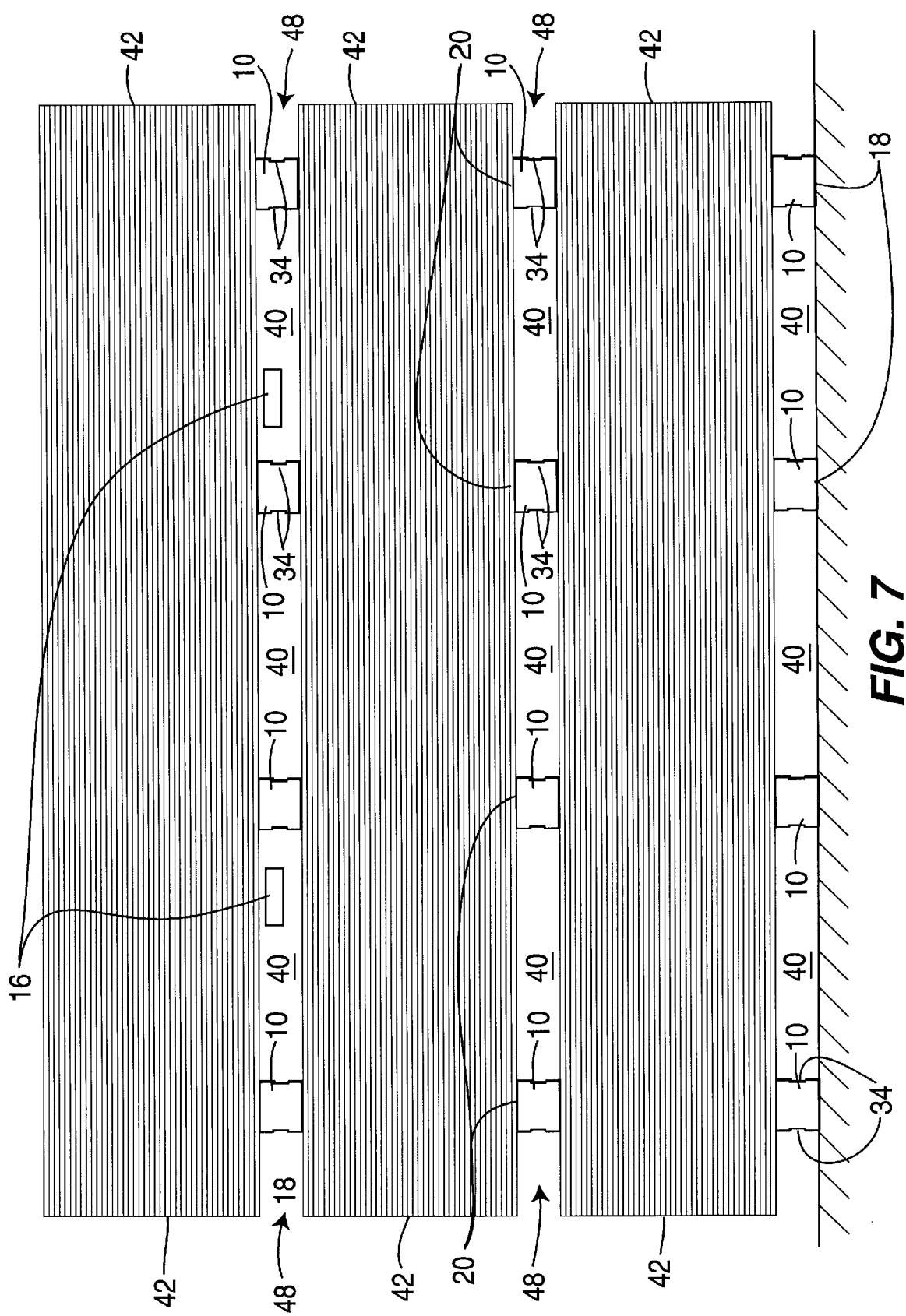
FIG. 7 is an illustration of use of the separation members of the present invention used in arrays between sections of a vertically extending stack of horizontally oriented sheet members.
Figure 8:
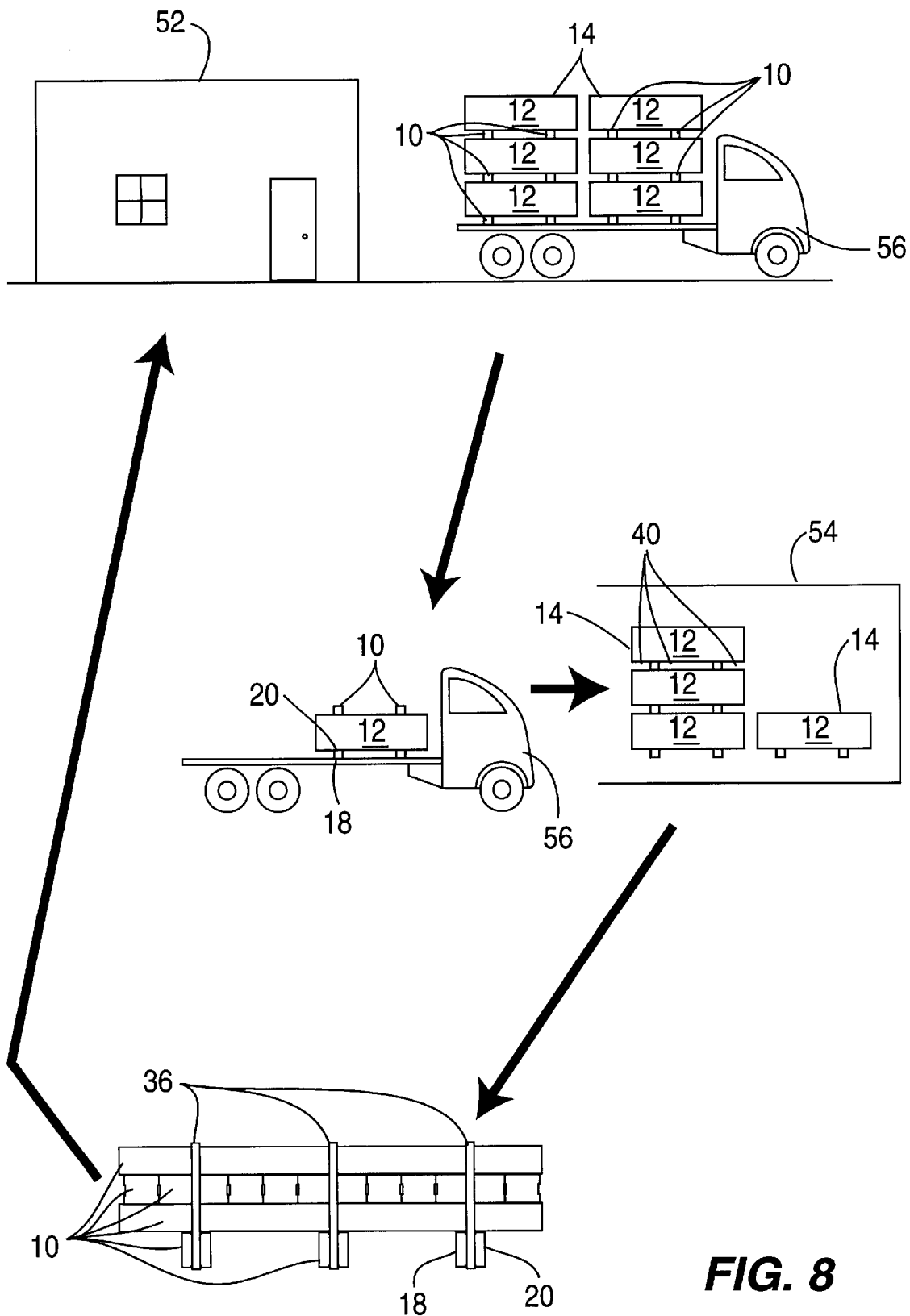
FIG. 8 shows the method of recycling use of the separation members of the present invention between a first location of manufacture or storage thereof and a second location of use or sale thereof.

The vertically extending stack 14 of such sheet members 12 can be extremely heavy. As such, it is helpful when handling thereof to move them in smaller sections. The sections normally comprise a subset of the total stack 14. The extreme weight of wallboard particularly when oriented as horizontally extending sheet members 12 is an important consideration. For this reason the vertically extending stack 14 thereof is divided into the individual sections 42 as shown best in FIG. 7. Each section 42 is separated from the immediately vertically adjacent section by an array 48 of the separation members 10. Normally the wallboard or sheet members 12 will be four feet in width and between eight and 12 feet in length. It is desirable that the array of separation members 48 include a separation member 10 positioned approximately every two to three feet thereby requiring for example three or four when positioned between eight to ten foot long sheet material. In this manner the separation member 10 will define therebetween a plurality of forklift receiving recesses 40. These recesses are defined between adjacent separation members 10 within an array 48 in the horizontal direction and are defined between the lowermost sheet member of one section of sheet members 12 and the uppermost sheet member 12 in the section 42 thereof immediately below. In this manner the forklift receiving recesses 40 will be capable of receiving forklift arms 16 extending thereinto to facilitate movement of one or more sections 42 of sheet members 12 thereby allowing movement of the stack 14 by moving of individual sections thereof singly or in groups.

The separation member 10 is preferably of a water impermeable material to prevent the accumulation of water thereagainst and also preferably defines drainage hole means 30 extending therethrough. Drainage hole means 30 further facilitates drying of the separation members 10 and ventilation therethrough. Preferably drainage holes 30 are oriented extending through each cellular section of each separation member 10 in an axial direction extending parallel to the first and second planar members 18 and 20.

Each separation member 10 preferably is constructed with a first planar support member 18 which is approximately rectangular in shape and is at least ten times as long longitudinally as laterally which is adapted to be in abutment with the section 42 of the stack 14 of sheet members 12 to be in engagement with the upper surface thereof. The second planar support member 20 will be fixedly secured with respect to the first planar support member 18 and spatially disposed upwardly therefrom and facing upwardly to be in contact with the lowermost sheet member 12 of the section 42 of sheet members 12 thereabove. The spatially distant positioning of the first planar support member 18 from the second planar support member 20 will be achieved by an interlocking cellular construction means 22 fixedly secured to support members 18 and 20. This interlocking cellular construction preferably comprises a supporting extrusion which maintains spatial separation between the first planar support member 18 and the second planar support member 20.

The supporting extrusion preferably includes a vertical support beam 26 extending vertically perpendicularly with respect to the support members 18 and 20 and defining therewith an I-beam support component 28 which significantly enhances the vertically extending strength of the separation member 10.

A cellular wall means 32 can extend transversely within the interlocking cellular construction 22 of the separation member 10 such as to be perpendicular to the first planar support member 18 and the second planar support member 20 while at the same time extending perpendicular with the respect to the vertical support beam 26. In this manner the cellular wall 32 and the vertical support beam 26 along with the planar support members 18 and 20 will define an interlocking cellular construction 22 which is significantly strong while at the same time providing an I-beam component 28 for establishing particularly enhanced strength in a vertically extending direction.

Preferably the interlocking cellular construction 22 and more particularly the cellular walls 32 will define therein a strapping notch 34. These strapping notches should be preferably placed in both sides of each separation member 10 in the cellular walls 32 thereof. Strapping notches 32 are defined to receive banding means 36 as best shown in FIG.

8 which will allow the separation members 10 to be recycled once the stack 14 of sheet members 12 is completely distributed at the second location 54 after all of the sheet members are either sold at the retail store or used at the construction site. This compact accumulated stack of separation members 10 can be returned to the first location 52 which is the point of manufacture or storage of the sheet members 12 such that they can be re-used in defining arrays 48 of separation members 10 in stacks 14 of sheet members 12 again moved from the first location to the second location. Normally this movement from the first location 52 to the second location 54 will be achieved by truck, train or other similar transport.

Figure 1:
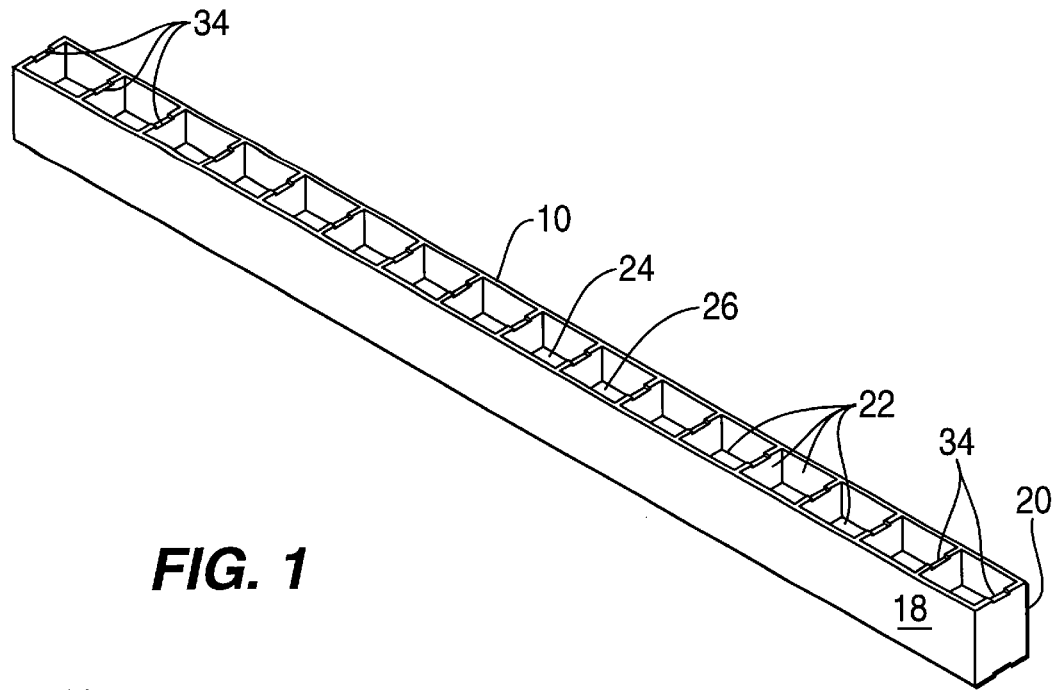
FIG. 1 is a perspective illustration of an embodiment of a separation member of the present invention.
Figure 2:
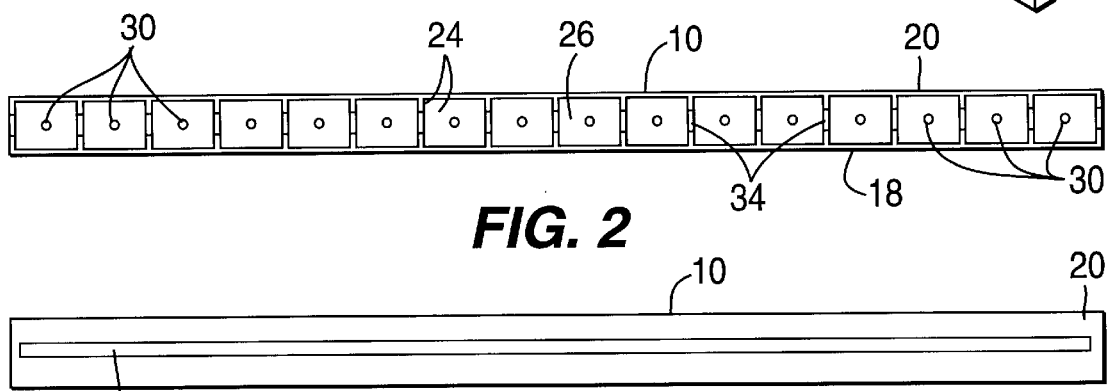
FIG. 2 is a side plan view of the embodiment shown in FIG. 1 showing drainage holes extending horizontally therethrough.
Figure 3:
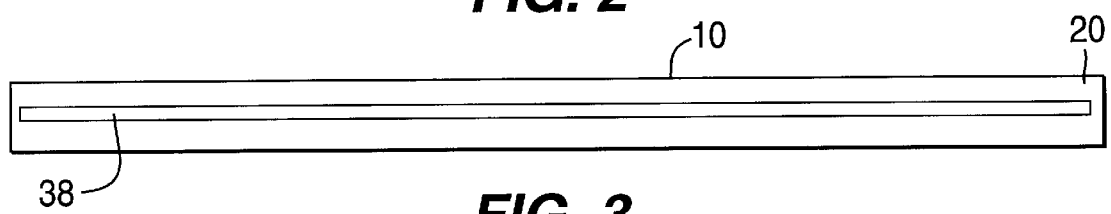
FIG. 3 is a top plan view of the embodiment shown in FIG. 1.
Figure 5:
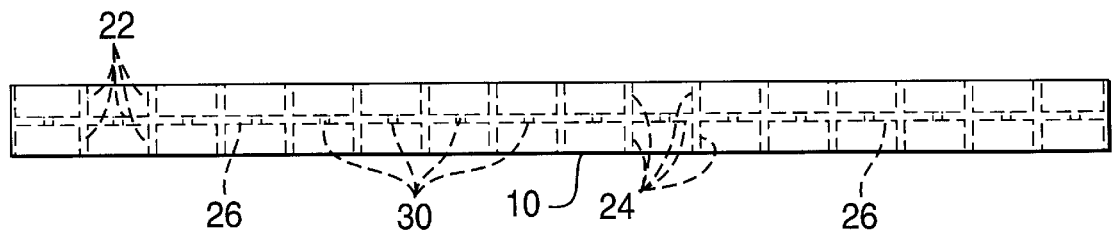
FIG. 5 is an illustration of the view and embodiment shown in FIG. 1 illustrating the hidden support walls comprising the interlocking cellular construction by the vertical support beam and the cellular walls shown in dotted outline.
Figure 4:
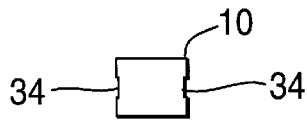
FIG. 4 is an end plan view of the embodiment shown in FIG. 1.
Figure 6:
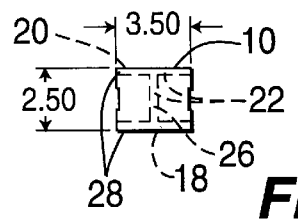
FIG. 6 is a side plan view as shown in FIG. 1 showing the vertical support beam and cellular wall construction of the interior thereof in dotted lines.

The firm engagement between the separation member 10 and in particular between the first planar support member 18 and the sheet member 12 thereadjacent as well as engagement between the second planar support member 20 and the sheet members 12 immediately thereadjacent is an important consideration in the present invention. For this reason a friction enhancing means 38 may be applied to the surface of the first planar support member 18 and the second planar support member 20. This friction enhancing means 38 can be any means for increasing the coefficient of friction of the surface thereof. FIG. 2 shows the application of a friction tape means to the surface of the second planar support member 20 which will be brought into engagement with one or more sheet members 12 for the purpose of enhancing firm securement therebetween.

Figure 9:
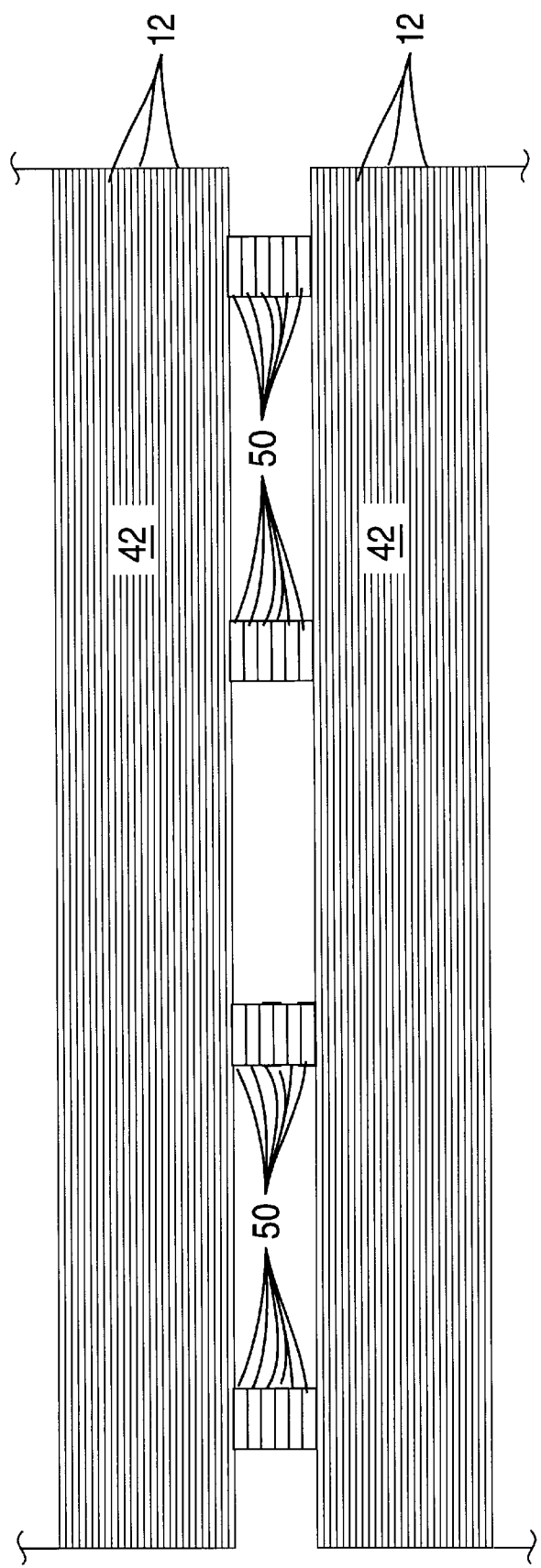
FIG. 9 is a prior art configuration showing horizontally oriented sheets of wallboard separated by stacks of slooters made therefrom which is prior art.

In the prior art currently utilized separation members are formed by cutting sheets of wallboard into a series of four feet long "slooters" which are approximately two to three inches wide. Five or six of these are then stacked between each individual section within a stack of horizontally oriented wallboard. The destruction of individual sheets of sheetrock for the sole purpose of providing these spacers members is a very wasteful process. Normally between 5%–15% of the total sheetrock in a given stack is destroyed solely for the purpose of making the individual slooters used for separation of sections of wallboard as shown in FIG. 9. There are many disadvantages for the use of three inch by forty-eight inch wallboard pieces as slooter separators. One of the primary disadvantages if in the wastage or loss of wallboard pieces. A loss of 5%–15% is an extremely high ratio of loss which can be completely eliminated by the recycling use of the separation members of the present invention. Also, when the second location 54 is a retail sales outlet, the amount of dust and paper wrapping falling into the retail sales aisles immediately adjacent to the stack of sheetrock or other material is a distinct disadvantage which creates both danger and further waste since the entire area needs to be cleaned or swept each time a vertical stack of wallboard is completely distributed by retail sales thereof.

The individual three inch by forty-eight inch slooters become completely destroyed, compressed or broken by the time the stack is completely distributed and they are normally merely discarded or thrown away. Recycling usage thereof is not possible. Breakage among such slooters made from wallboard is a serious problem particularly in retail sales outlets where walking areas for customers and other members of the public needs to be maintained in a safe condition.

Also the wallboard has a tendency to vary significantly in thickness and, as such, the vertical dimension of a stack of five or six slooters can vary greatly even within a single array. This variation can allow a significant amount of warping due to the uneven height of the stacks of slooters immediately below a section of virgin wallboard thereabove.

The present invention overcomes the disadvantages of the temporary slooters made from wallboard shown in FIG. 9 by providing a separator member which is of a fixed dimension and is completely recyclable and does not generate any dust or wastage immediately adjacent to the stack 14 of horizontally extending sheet members 12 at the time of usage or retail sale thereof. Also the wastage eliminated by not requiring the destruction of between 5% and 15% of the wallboard sheets to provide spacers in between the sections of stacks thereof is another significant savings in both time and cost.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. Separation members for selective placement between sheet members oriented horizontally and stacked vertically allowing a forklift to extend between the sheet members and between the separation members to facilitate simultaneous handling of sheet members located thereabove, each of said separation members comprising:

A. a first planar support member extending horizontally across and above one of the stacked sheet members and in abutment therewith;

B. a second planar support member positionable extending horizontally below a sheet member thereabove and in abutment therewith for supporting thereof in spaced relation above a sheet member therebelow, said second support member being fixedly secured in spaced relation vertically above said first support member by a distance sufficient to allow a forklift to extend thereadjacent between the sheet members vertically and between said separation members horizontally for facilitating lifting of any horizontally oriented sheet materials located thereabove by the forklift without moving said separation members thereadjacent therewith; and C. an interlocking cellular construction means fixedly secured to said first planar support member and said second planar support member and extending therebetween for maintaining same in spaced relation to one another and for enhancing the support provided by said second planar support member for the sheet members positioned thereabove, said interlocking cellular construction means including a vertical support beam means extending vertically between said first planar support member and said second planar support member and extending longitudinally therethrough for facilitating strengthening thereof, said vertical support beam means being oriented perpendicularly with respect to said first planar support member and with respect to said second planar support member and longitudinally therealong, said vertical support beam means extending upwardly from said first planar support member and downwardly from said second planar support member to define an I-beam support component for enhancing structural strength of each separation member, said interlocking cellular construction means further including a plurality of cellular wall means extending perpendicularly with respect to said first planar support member and said second planar support member and also extending perpendicularly with respect to said vertical support beam means to define said interlocking cellular construction means therebetween for facilitating strengthening of the separation members.

2. Separation members for selective placement between sheet members oriented horizontally and stacked vertically allowing a forklift to extend between the sheet members and between the separation members to facilitate simultaneous handling of sheet members located thereabove as defined in claim 1 wherein said interlocking cellular construction means comprises a supporting extrusion means for reinforcing the spatially distant positioning of said first planar support member relative to said second planar support member.

3. Separation members for selective placement between sheet members oriented horizontally and stacked vertically allowing a forklift to extend between the sheet members and between the separation members to facilitate simultaneous handling of sheet members located thereabove as defined in claim 2 wherein said supporting extrusion means is made of a thermoplastic material.

4. Separation members for selective placement between sheet members oriented horizontally and stacked vertically allowing a forklift to extend between the sheet members and between the separation members to facilitate simultaneous handling of sheet members located thereabove as defined in claim 1 wherein said first planar support member, said interlocking cellular construction means and said second planar support member comprise a single integral structural member made of thermoplastic material.

5. Separation members for selective placement between sheet members oriented horizontally and stacked vertically allowing a forklift to extend between the sheet members and between the separation members to facilitate simultaneous handling of sheet members located thereabove as defined in claim 1 wherein at least two of said separation members are positioned at each level between adjacent sheet members to define therebetween forklift receiving recesses for allowing a forklift to extend thereinto to facilitate lifting of the horizontally oriented sheet members thereabove without movement of the separation members at the same level and for allowing air circulation therethrough to facilitate drying.

6. Separation members for selective placement between sheet members oriented horizontally and stacked vertically allowing a forklift to extend between the sheet members and between the separation members to facilitate simultaneous handling of sheet members located thereabove as defined in claim 5 wherein a plurality of said separation members are positioned adjacent to a sheet member spatially disposed from one another at approximately two feet to define said forklift receiving recesses therebetween.

7. Separation members for selective placement between sheet members oriented horizontally and stacked vertically allowing a forklift to extend between the sheet members and between the separation members to facilitate simultaneous handling of sheet members located thereabove as defined in claim 1 wherein each of said separation members is generally rectangular with a length to width ratio of at least 10 to 1.

8. Separation members for selective placement between sheet members oriented horizontally and stacked vertically allowing a forklift to extend between the sheet members and between the separation members to facilitate simultaneous handling of sheet members located thereabove as defined in claim 1 wherein said interlocking cellular construction means defines a strapping notch means therein to facilitate banding together of a plurality of the separation members to facilitate gathering thereof for recycling.

9. Separation members for selective placement between sheet members oriented horizontally and stacked vertically allowing a forklift to extend between the sheet members and between the separation members to facilitate simultaneous handling of sheet members located thereabove as defined in claim 8 wherein each of said strapping notch means is positioned spatially distant from said first planar support member and said second planar support member and extends perpendicularly with respect thereto to facilitate banding thereof laterally.

10. Separation members for selective placement between sheet members oriented horizontally and stacked vertically allowing a forklift to extend between the sheet members and between the separation members to facilitate simultaneous handling of sheet members located thereabove as defined in claim 9 further comprising a banding means adapted to be positioned extending into said strapping notch means of the separation members to facilitate lateral securement of a plurality of separation members together to facilitate handling during recycling thereof.

11. Separation members for selective placement between sheet members oriented horizontally and stacked vertically allowing a forklift to extend between the sheet members and between the separation members to facilitate simultaneous handling of sheet members located thereabove as defined in claim 1 further comprising a friction enhancing means applied onto said first planar support member and said second planar support member to increase the coefficient of friction thereof and facilitate abutting engagement with the horizontally extending sheet members thereadjacent.

12. Separation members for selective placement between sheet members oriented horizontally and stacked vertically allowing a forklift to extend between the sheet members and between the separation members to facilitate simultaneous handling of sheet members located thereabove as defined in claim 11 wherein said friction enhancing means comprises a friction tape means secured on said first planar support member and said second planar support member to enhance engagement thereof with respect to the horizontally extending sheets members in contact therewith above and below.

13. Separation members for selective placement between sheet members oriented horizontally and stacked vertically allowing a forklift to extend between the sheet members and between the separation members to facilitate simultaneous handling of sheet members located thereabove as defined in claim 1 wherein said interlocking cellular construction means defines a drainage hole means positioned extending therethrough to facilitate fluid drainage of therethrough.

14. Separation members for selective placement between sheet members oriented horizontally and stacked vertically allowing a forklift to extend between the sheet members and between the separation members to facilitate simultaneous handling of sheet members located thereabove, each of said separation members comprising:

A. a first planar support member extending horizontally across and above one of the stacked sheet members and in abutment therewith, said first planar support member having a length to width ratio of at least 10 to 1;

B. a second planar support member positionable extending horizontally below a sheet member thereabove and in abutment therewith for supporting thereof in spaced relation above a sheet member therebelow, said second planar support member having a length to width ratio of at least 10 to 1, said second support member being fixedly secured in spaced relation vertically above said first support member by a distance sufficient to allow a forklift to extend thereadjacent between the sheet members vertically and between said separation members horizontally for facilitating lifting of any horizontally oriented sheet materials located thereabove by the forklift without moving said separation members thereadjacent therewith; and C. an interlocking cellular construction means fixedly secured to said first planar support member and said second planar support member and extending therebetween for maintaining same in spaced relation to one another and for enhancing the support provided by said second planar support member for the sheet members positioned thereabove, said interlocking cellular construction means comprising a supporting extrusion means of a thermoplastic material for reinforcing the spatially distant positioning of said first planar support member relative to said second planar support member, said first planar support member and said second planar support member and said supporting extrusion means of said interlocking cellular construction means comprising an extruded integral member made of thermoplastic material, said supporting extrusion means including:

A. a vertical support beam means extending vertically between said first planar support member and said second planar support member and extending longitudinally therethrough for facilitating strengthening thereof, said vertical support beam means being oriented perpendicularly with respect to said first planar support member and with respect to said second planar support member and longitudinally therealong and wherein said vertical support beam means extends upwardly from said first planar support member and downwardly from said second planar support member to define an I-beam support component for enhancing structural strength of each of the separation members, said vertical support beam means defining a drainage hole means positioned extending therethrough to facilitate fluid drainage therethrough; and B. a plurality of cellular wall means extending perpendicularly with respect to said first planar support member and said second planar support member and also extending perpendicularly with respect to said vertical support beam means to define said interlocking cellular construction wall means therebetween for facilitating strengthening of each of the separation member, said cellular wall means defining a strapping notch means therein to facilitate banding together of a plurality of the separation members to facilitate gathering thereof for recycling, each of said strapping notch means oriented extending perpendicularly with respect to said first planar support member and said second planar support member to facilitate temporary banding together laterally of a plurality of the separation members for facilitating recycling thereof;

C. a banding means adapted to be positionable extending into said strapping notch means of the separation members to facilitate selective lateral securement of a plurality of separation members together to facilitate handling thereof during recycling;

D. a friction enhancing means located on said first planar support member and said second planar support member to increase the coefficient of friction thereof and facilitate abutting engagement with the horizontally extending sheet members; and wherein each of said separation members is generally rectangular with a length to width ratio of at least 10 to 1, and wherein at least two of said separation members are positioned at each level between sheet members to define therebetween forklift receiving recesses for allowing a forklift to extend thereinto to facilitate lifting of the horizontally oriented sheet members thereabove without movement of the separation members at the same level, and further wherein a plurality of said separation members are positioned adjacent to each sheet member spatially disposed from one another laterally at approximately twenty-four inches to define said forklift receiving recesses therebetween.

* * * * *